US008746132B2

(12) United States Patent
Lawrence et al.

(10) Patent No.: US 8,746,132 B2
(45) Date of Patent: Jun. 10, 2014

(54) HEATED DISCHARGE PLATEN FOR DOUGH PROCESSING SYSTEM

(75) Inventors: Eric Clay Lawrence, Huntington Beach, CA (US); Mark Patrick Lawrence, Sunset Beach, CA (US)

(73) Assignee: Lawrence Equipment Inc., South El Monte, CA (US)

( * ) Notice: Subject to any disclaimer, the term of this patent is extended or adjusted under 35 U.S.C. 154(b) by 478 days.

(21) Appl. No.: 11/203,508

(22) Filed: Aug. 12, 2005

(65) Prior Publication Data

US 2007/0034092 A1 Feb. 15, 2007

(51) Int. Cl.
*A21B 1/40* (2006.01)
*A21B 1/48* (2006.01)
*A21C 9/08* (2006.01)
*A21C 11/00* (2006.01)

(52) U.S. Cl.
CPC ............... *A21C 9/08* (2013.01); *A21C 11/006* (2013.01)
USPC ............ 99/349; 99/443 C; 219/388; 426/468; 426/523

(58) Field of Classification Search
USPC ........... 99/326–333, 349–355, 339, 389–391, 99/444–450; 426/523
See application file for complete search history.

(56) References Cited

U.S. PATENT DOCUMENTS

| | | | |
|---|---|---|---|
| 1,885,935 A | 11/1932 | Mcallister | |
| 2,525,348 A | 10/1950 | Glass | |
| 2,642,177 A | 6/1953 | Glaze et al. | |
| 2,709,412 A | 5/1955 | Eagerman | |
| 2,799,384 A | 7/1957 | Rutherford | |
| 2,822,942 A | 2/1958 | Lanham | |
| 2,878,776 A | 3/1959 | Vogel | |
| 3,106,291 A | 10/1963 | Tisch | |
| 3,321,807 A | 5/1967 | O'Brien | |
| 3,348,680 A | 10/1967 | Matthews et al. | |
| 3,379,141 A * | 4/1968 | Groth | 426/391 |
| 3,382,530 A | 5/1968 | Glesner | |
| 3,397,655 A * | 8/1968 | Heliodoro Valadez et al. | 99/353 |
| 3,398,679 A | 8/1968 | Grivet | |
| 3,469,690 A | 9/1969 | Ervin | |
| 3,565,015 A * | 2/1971 | Jorgensen | 425/166 |
| 4,116,119 A | 9/1978 | Kuhlman | |
| 4,208,574 A | 6/1980 | Schafer | |
| 4,430,915 A | 2/1984 | Rutherford | |
| 4,546,886 A | 10/1985 | Churchland | |
| 4,651,881 A | 3/1987 | Wallin | |

(Continued)

FOREIGN PATENT DOCUMENTS

EP 0323565 7/1989
EP 0520136 A2 12/1992

(Continued)

OTHER PUBLICATIONS

Partial translation for JP 07-143841, Yasunoba, "MAnufacturing Apparatus for Wrapped Rice Cake," Jun. 6, 1995.*

(Continued)

*Primary Examiner* — Joseph M Pelham
(74) *Attorney, Agent, or Firm* — Fish & Richardson P.C.

(57) ABSTRACT

A dough forming apparatus for flatbread products, the apparatus having: a loading station; a pressing station; a discharge station; and a conveyor belt passing through the loading station, the pressing station and the discharge station; wherein the discharge station further comprises a heated discharge platen.

20 Claims, 4 Drawing Sheets

(56) References Cited

U.S. PATENT DOCUMENTS

| | | | |
|---|---|---|---|
| 4,683,813 A | 8/1987 | Schultz | |
| 4,769,106 A | 9/1988 | Busching | |
| 4,776,789 A | 10/1988 | Ehrich | |
| 4,899,869 A | 2/1990 | Johnson | |
| 4,905,581 A * | 3/1990 | Kirkpatrick | 99/353 |
| 4,938,126 A * | 7/1990 | Rubio et al. | 99/349 |
| 5,006,358 A | 4/1991 | Ribio et al. | |
| 5,118,515 A | 6/1992 | Montemayor et al. | 426/128 |
| 5,139,801 A | 8/1992 | de Jesus Montemayor et al. | 426/274 |
| 5,158,132 A | 10/1992 | Guillemot | |
| 5,160,377 A | 11/1992 | Montemayor et al. | 118/13 |
| 5,231,919 A * | 8/1993 | Lawrence et al. | 99/334 |
| RE34,530 E | 2/1994 | Kirkpatrick | |
| 5,300,170 A | 4/1994 | Donohoe | |
| 5,388,503 A * | 2/1995 | Buerkle | 99/349 |
| 5,392,696 A | 2/1995 | Navarro et al. | |
| 5,400,909 A | 3/1995 | Tomat | |
| 5,564,554 A | 10/1996 | Lawrence | 198/432 |
| 5,592,870 A | 1/1997 | Sanchez | |
| 5,630,358 A * | 5/1997 | Patel | 99/349 |
| 5,635,235 A | 6/1997 | Sanchez | |
| 5,649,473 A | 7/1997 | Lawrence | |
| 5,749,283 A | 5/1998 | Funk | |
| 5,879,734 A | 3/1999 | Broyles | |
| 5,918,533 A | 7/1999 | Lawrence et al. | |
| 5,931,083 A * | 8/1999 | Stanger et al. | 99/388 |
| 5,964,144 A | 10/1999 | Chapa | |
| 5,979,302 A | 11/1999 | Funk et al. | |
| 5,996,476 A * | 12/1999 | Schultz | 99/349 |
| 6,026,738 A * | 2/2000 | Charles et al. | 99/349 |
| 6,083,083 A | 7/2000 | Nishimura | |
| 6,112,647 A | 9/2000 | Brunner et al. | |
| 6,244,941 B1 | 6/2001 | Bowman et al. | |
| 6,250,217 B1 | 6/2001 | Korybutiak | |
| 6,302,767 B1 | 10/2001 | Tietz | |
| 6,382,427 B1 | 5/2002 | Nakhei-Nejad | |
| 6,398,539 B1 | 6/2002 | Lawrence | |
| 6,439,366 B1 | 8/2002 | Matkovich | |
| 6,638,553 B2 | 10/2003 | Bell et al. | |
| 6,835,118 B2 | 12/2004 | Berkstresser et al. | |
| 6,951,451 B2 * | 10/2005 | Schultz | 425/145 |
| 7,067,167 B2 | 6/2006 | Damsgard et al. | |
| 7,086,325 B2 | 8/2006 | Armstrong | |
| 7,097,026 B2 | 8/2006 | Lawrence | |
| 7,134,543 B2 | 11/2006 | Barry et al. | |
| 7,228,972 B2 | 6/2007 | Ghosh | |
| 7,229,270 B2 | 6/2007 | Schultz | |
| 7,264,107 B2 | 9/2007 | Lawrence | |
| 7,325,483 B2 * | 2/2008 | Szymanski | 99/349 |
| 2003/0143309 A1 | 7/2003 | Kindie et al. | |
| 2003/0232103 A1 | 12/2003 | Marino et al. | |
| 2004/0191378 A1 | 9/2004 | Golby et al. | |
| 2004/0211323 A1 * | 10/2004 | Heinzen et al. | 99/349 |
| 2004/0241267 A1 | 12/2004 | Schultz | |
| 2005/0287240 A1 | 12/2005 | Mattias et al. | |
| 2007/0023257 A1 | 2/2007 | Schiesser | |
| 2007/0039480 A1 * | 2/2007 | Schultz | 99/352 |
| 2007/0045232 A1 | 3/2007 | Murai et al. | |
| 2009/0272277 A1 | 11/2009 | Lawrence | |

FOREIGN PATENT DOCUMENTS

| | | | | |
|---|---|---|---|---|
| EP | 1219174 A1 | | 7/2002 | |
| EP | 1609364 A2 | | 12/2005 | |
| EP | 1670702 | | 12/2010 | |
| GB | 1109887 A | | 4/1968 | |
| GB | 1416875 | | 12/1975 | |
| GB | 2393895 A | | 4/2004 | |
| JP | 01196248 A | * | 8/1989 | A21C 11/00 |
| JP | 07143841 A | * | 6/1995 | A21C 11/00 |
| WO | WO9616583 A1 | | 6/1996 | |
| WO | WO 2008118026 | | 10/2008 | |
| WO | WO 2009/135123 | | 11/2009 | |

OTHER PUBLICATIONS

PCT/US2009/042519 filed May 1, 2009, International Search Report and Written Opinion of the International Searching Authority, European Patent Office, issued Nov. 10, 2010, 11 pages.

CasaHerrera, CH-51 Automated Inspection Systems, [Online], Retrieved from the Internet at http://www.casaherrera.com/machine-tortilla-flatbread-automated-inspection-systems on Nov. 9, 2010, 3 pages.

CasaHerrera, CH-51 Automated Inspection Systems, [Online], Retrieved from the Internet at http://www.casaherrera.com/managedocs/download.php?doc=brochure_vision-system_CH-51_Flour.pdf on Nov. 9, 2010, 2 pages. Dated Jan. 22, 2010.

* cited by examiner

HEATED DISCHARGE PLATEN FOR DOUGH PROCESSING SYSTEM

BACKGROUND OF THE INVENTION

The present invention relates to a dough processing apparatus, such as a flour tortilla making machine, and in particular is directed to an improved discharge platen for such an apparatus.

Normally, presses for flat breads and tortillas have upper and lower platens equipped with heat elements. Dough balls are moved on a conveyor through the press. After the dough balls are pressed flat, the resulting flattened dough elements are typically moved onto an unheated holding station to rest for a second or two before being discharged into an oven or for other subsequent processing.

Discharge typically involves some combination of malleable or flexible-stripping elements mounted to a rotating shaft, as well as a jet of air to aid in the transfer of the pressed dough elements from the holding station onto a mesh or other conveyor. The discharge is often a source of great waste. If the bottom side of a pressed dough element is not heated enough, then the pressed dough element will not release from the main conveyor without distortion to the product. Conversely, if the bottom side of a pressed dough element is heated too much, then the pressed dough element can be dislodged from its relative orientation causing waste from overlaps.

Therefore, problems discharging pressed dough elements from the holding station often limit production speed and negatively impact the quality of the finished products. There is a need for an improved apparatus for processing pressed dough.

SUMMARY OF THE INVENTION

Accordingly, the present invention is direct to a dough forming apparatus for flatbread products, the apparatus comprising: a loading station; a pressing station; a discharge station; and a conveyor belt passing through the loading station, the pressing station and the discharge station; wherein the discharge station further comprises a heated discharge platen.

The heated discharge platen can have a variable heating element. Additionally, the discharge platen can have a temperature sensor. A controller can be coupled to the variable heating element and the temperature sensor, the controller altering the heat from the heating element in response to a temperature sensed by the temperature sensor.

The heat discharge platen can be heated by an open flame positioned below the heated discharge platen. Alternatively, the heated discharge platen has a channel with an electric heating element positioned in the channel or a heated fluid pumped through the channel. Additionally, the pressing station may have heated upper and lower pressing platens with the upper pressing platen being heated to a higher temperature than the lower pressing platen.

The present invention is also directed to a method for making dough for flatbread products comprising the steps of: loading a dough ball on a conveyor at a loading station; advancing a dough ball on the conveyor to a pressing station; pressing the dough ball in the pressing station; forwarding the pressed dough ball to a discharge station; and heating the pressed dough ball on the discharge station.

BRIEF DESCRIPTION OF THE DRAWINGS

These and other features, aspects, and advantages of the present invention will become better understood with reference to the following description, appended claims, and accompanying drawings, where:

DETAILED DESCRIPTION

Figure 1:
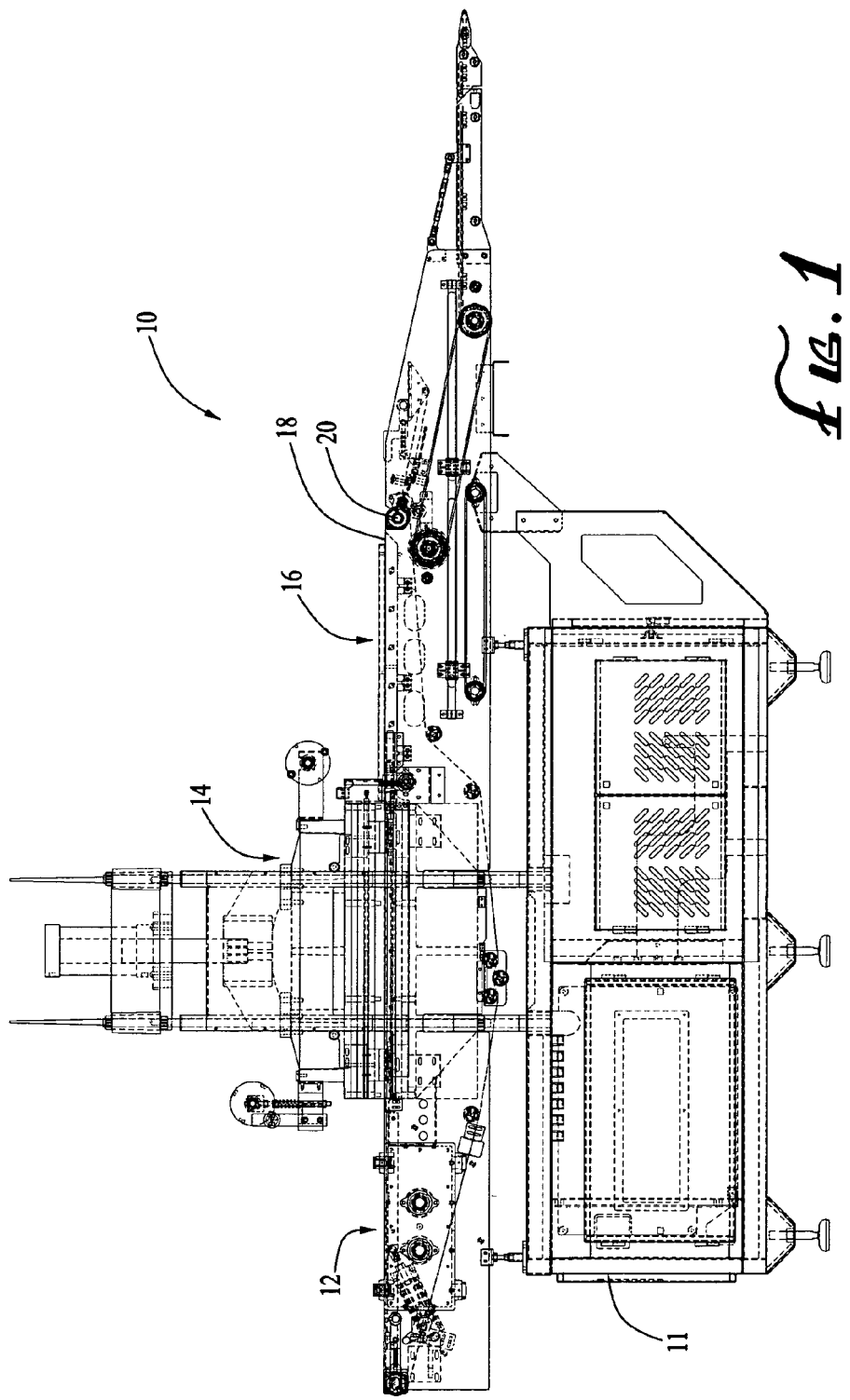
FIG. 1 is a side elevation view of a dough processing apparatus according to an embodiment of the present invention.
Figure 2:
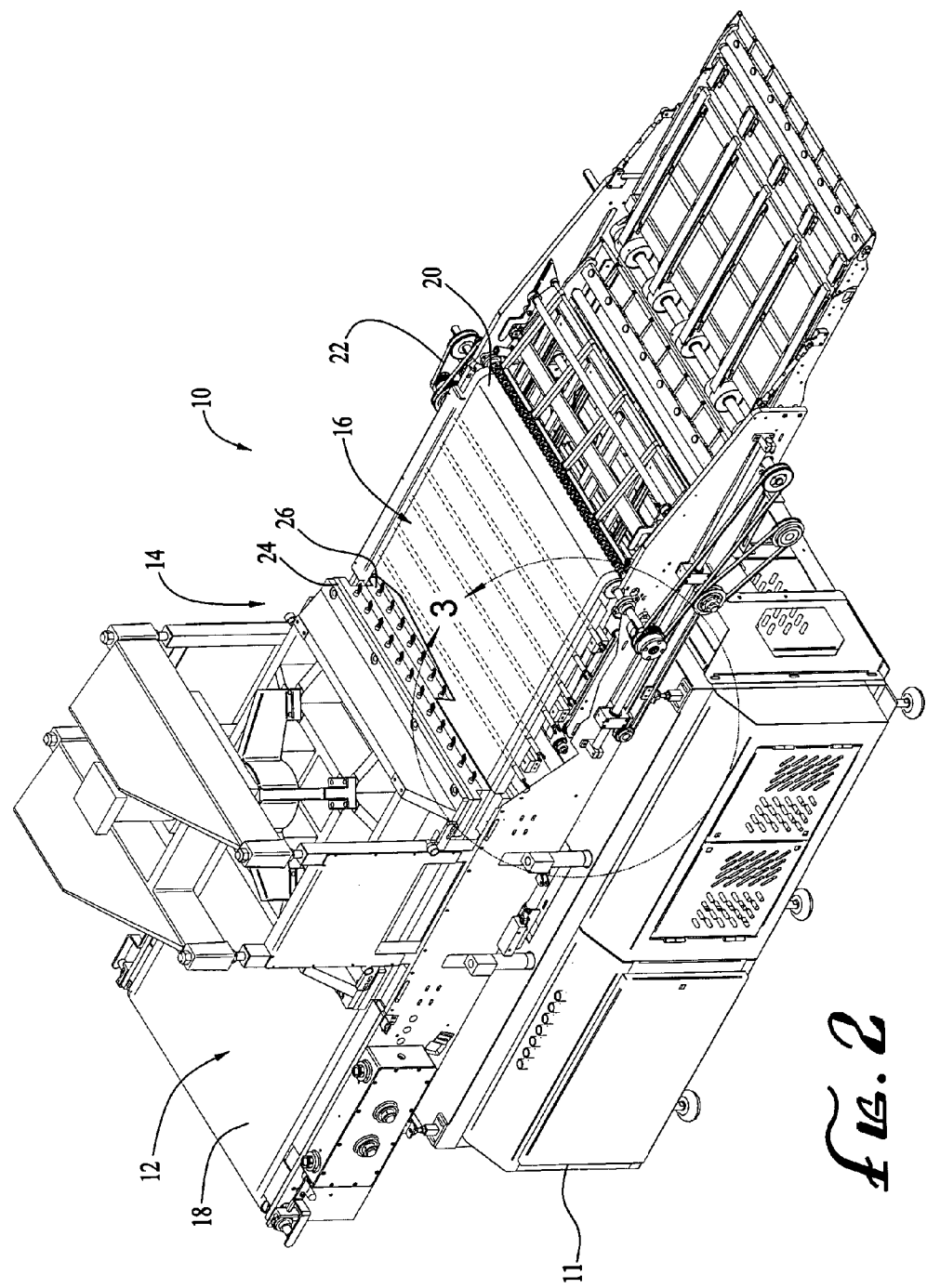
FIG. 2 is a perspective view of the apparatus of FIG. 1 showing a partially cut-away discharge platen.

Referring to FIGS. 1 and 2, a dough pressing apparatus, generally designated 10, of the type in which the heated discharge platen of the present invention may be used is illustrated. The apparatus 10 includes a support housing 11 that supports the apparatus 10 on the ground and contains many of the operating components and controls (not shown) for the apparatus. The apparatus includes a loading station 12, a pressing station 14 and a discharge station 16 for loading, pressing and discharging, respectively, the dough balls that are being processed by the apparatus 10.

Dough balls are placed onto a conveyor belt 18. The apparatus may be of a width to accommodate plural rows of dough balls. The conveyor belt 18 is then advanced a predetermined distance by a drive roller 20 which is rotated by a drive mechanism 22 for a predetermined number of revolutions to cause the desired distance of movement of the conveyor belt to bring the dough balls into proper position within the pressing station 14.

When the conveyor belt 18 is stopped by stoppage of the drive roller 20, an upper pressing platen 24 of the pressing station 14 is moved downwardly with an appropriate force and spacing from a lower pressing platen 26 of the pressing station 14 for squeezing the dough balls to a desired thickness and shape. One or both of the pressing platens 24 and 26 are heated for causing parbaking of the dough balls to maintain a flattened condition and proper texture. The upper pressing platen 26 is then raised and the conveyor belt is advanced by the drive roller 20 to move the flattened dough balls from the pressing station 14 to the discharge station 16 and advance new dough balls from the loading station 12 to the pressing station 14 for repeating the cycle.

The discharge station 16 has a heated discharge platen 28. Preferably, the discharge platen 28 is made of metal such as aluminum. The discharge platen 28 is heated by a heater 30.

Figure 3:
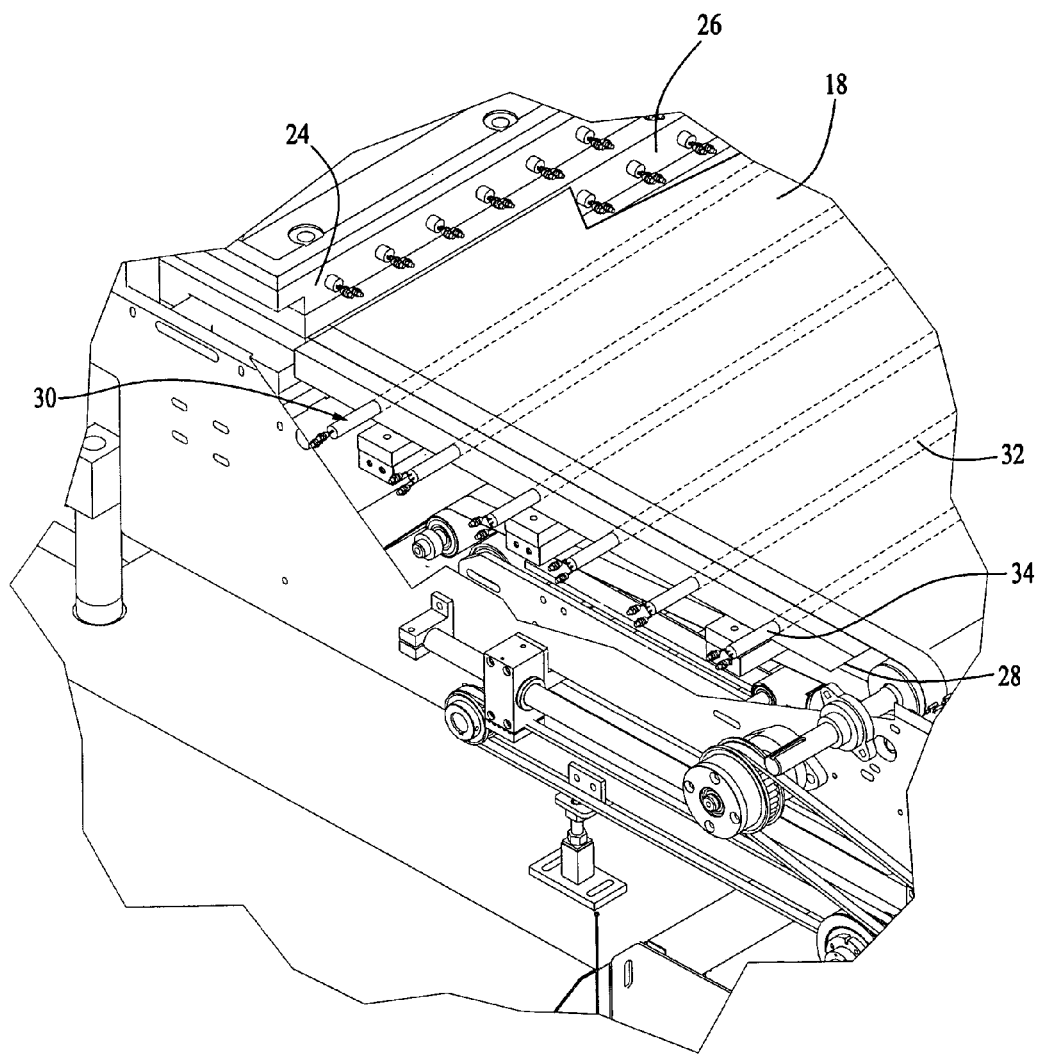
FIG. 3 is a magnified view of portion 3 of FIG. 2.

In an embodiment of the present invention, as shown in FIGS. 2 and 3, the heater 30 is an electric heater. Channels 32 are formed throughout the platen, such as by drilling. Rod shaped electric heating elements 34 are mounted in the channels 32 using an adhesive. Such a construction is advantageous, because broken heating elements 34 can be removed from the channels and replaced. Additionally, individual heating elements can be separately and variably controlled. Alternatively, a circular or annular heater may be coupled to the discharge platen or routed inside a circular shaped channel formed in the discharge platen.

In an alternative embodiment, the heater 30 utilizes a recirculated fluid such as oil heated by a heat source. In this embodiment, a plurality of channels are formed in the discharge platen 28 and the heated fluid is pumped through the channels by a pump. The channels may have a variety of different shapes to distribute the heated fluid through the discharge platen so as to either heat the platen uniformly or to variably heat particular portions of the discharge platen. For example, the channels may be serpentine, or circular. This type of heater is advantageous because it allows for uniform heating of the discharge platen. In another alternative embodiment of the present invention, the heater 30 is an open flame positioned below the discharge platen 28.

Figure 4:
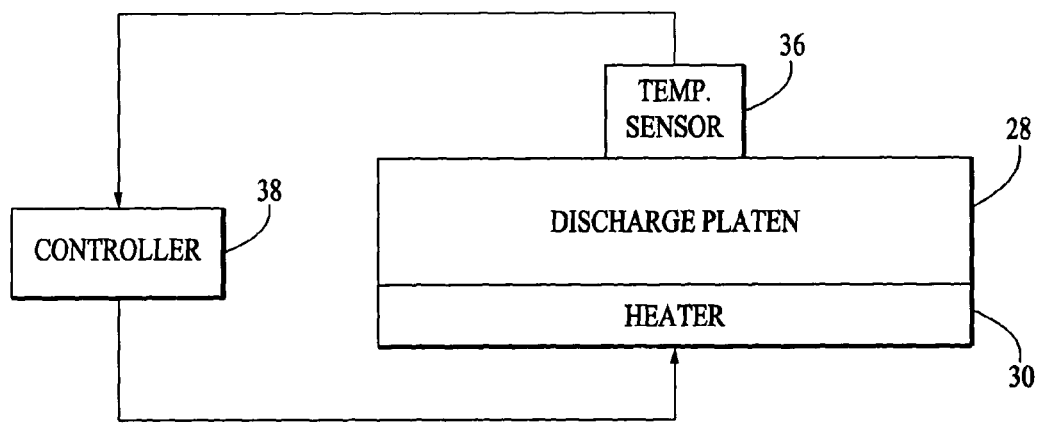
FIG. 4 is a schematic diagram of a system employing a heated discharge platen according to an embodiment of the present invention.

As shown in FIG. 4, at least one temperature sensor 36, such as a thermocouple made by Allen Bradley of Rockwell Automation in Milwaukee, Wis. may be coupled to the discharge platen to monitor the temperature. For example, the temperature sensor 36 may be mounted in the center of the discharge platen 28. A plurality of temperature sensors may be coupled to the discharge platen to monitor the temperature at a plurality of different locations.

Preferably, the temperature sensor 36 and the heater 30 are coupled to a controller 38. The controller 38, which may be a computer coupled to user input and display devices, may be independent. Alternatively, the controller 38 may also control one or more of the heating of the upper pressing platen 24, the heating of the lower pressing platen 26 and the speed of the conveyor. The use of a plurality of thermocouples in combination with a heater having a plurality of separately controllable heating elements allows for differential temperatures to be separately generated and controlled on different areas of the discharge platen.

Optionally, the discharge platen is multilayered. Separately controllable heaters 30 and thermocouples 36 may be provided for each layer.

As a result of the heated discharge platen of the present invention, faster dough processing apparatus cycling times can be achieved. Additionally, products produced by a dough processing apparatus according to the present invention have greater consistency. Additionally, the temperature of the lower pressing platen can be lowered, because the discharge platen allows for additional heating of the lower side of the pressed dough element. Lowering the temperature of the lower pressing platen allows for the formation of rounder product shapes.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Also, any element in a claim that does not explicitly state "means for" performing a specified function or "step for" performing a specified function, should not be interpreted as a "means" or "step" clause as specified in 35 U.S.C. section 112.

Although the present invention has been discussed in considerable detail with reference to certain preferred embodiments, other embodiments are possible. Therefore, the scope of the appended claims should not be limited to the description of preferred embodiments contained in this disclosure.

We claim:

1. A dough forming apparatus comprising:
   a loading station;
   a pressing station comprising upper and lower heated pressing platens;
   a first controller to adjust the temperature of the upper and lower heated pressing platens, wherein the upper heated pressing platen is heated to a higher temperature than the lower heated pressing platen;
   a discharge station comprising a heated discharge platen comprising a plurality of separately controllable, variable heating elements, each of the variable heating elements being independent of both the upper pressing platen and the lower pressing platen; and
   a conveyor belt capable of serially moving a plurality of dough balls between the loading station, the pressing station, and the discharge station.

2. The apparatus of claim 1 wherein the heated discharge platen comprises a temperature sensor.

3. The apparatus of claim 2 comprising a second controller that couples to the variable heating elements and the temperature sensor.

4. The apparatus of claim 1 wherein the heated discharge platen comprises:
   a plurality of channels, wherein each of the variable heating elements is positioned in a corresponding channel.

5. The apparatus of claim 4 wherein each of the variable heating elements comprises a rod.

6. The apparatus of claim 4 wherein:
   each of the plurality of channels is circular; and
   each of the variable heating elements is circular or annular.

7. The apparatus of claim 1 wherein the heated discharge platen comprises:
   a plurality of channels channel, wherein each of the variable heating elements comprises a fluid pumped through a corresponding channel.

8. The apparatus of claim 1 wherein each of the variable heating elements comprise an electric heating element.

9. The apparatus of claim 8 wherein each of the electric heating elements comprises a rod.

10. A dough forming apparatus comprising:
    a loading station;
    a pressing station comprising upper and lower heated platens;
    a discharge station comprising a heated discharge platen comprising:
      a plurality of channels;
      a plurality of separately controllable electric heating elements, a single electric heating element being positioned in each of the plurality of channels; and
      at least one temperature sensor; and
    a conveyor belt capable of serially moving a plurality of dough balls between the loading station, the pressing station and the discharge station.

11. The apparatus of claim 10 comprising a controller coupled to the electric heating elements and the at least one temperature sensor.

12. A dough forming apparatus comprising:
    a loading station;
    a pressing station comprising:
      an upper pressing platen; and
      a lower pressing platen, wherein the upper pressing platen is capable of being heated to a higher temperature than the lower pressing platen;
    a discharge station comprising:
      a plurality of channels;
      a variable heating element comprising a plurality of separately controllable electric heating elements, each of the plurality of electric heating elements being positioned in one of the plurality of channels; and
      at least one temperature sensor;
    a controller coupled to the electric heating elements and the at least one temperature sensor; and
    a means for moving dough serially between the loading station, the pressing station and the discharge station.

13. The dough forming apparatus of claim 12 wherein the at least one temperature sensor comprises a plurality of temperature sensors, each of the plurality of temperature sensors coupled to the controller and to one of the plurality of electric heating elements.

14. A dough forming apparatus comprising:
a loading station;
a pressing station comprising upper and lower heated platens;
a discharge station comprising a heated discharge platen with a variable heating element, the variable heating element comprising a plurality of separately controllable electrical heating elements; and
a conveyor belt capable of serially moving a plurality of dough balls between the loading station, the pressing station and the discharge station.

15. The dough forming apparatus of claim 14 comprising a plurality of temperature sensors, wherein each of the plurality of temperatures sensors is coupled to the controller and to one of the plurality of electrical heating elements.

16. A dough forming apparatus comprising:
a discharge station comprising a heated discharge platen with a variable heating element, wherein the variable heating element comprises a plurality of separately controllable electrical heating elements.

17. The apparatus of claim 16 comprising a temperature sensor.

18. The apparatus of claim 17 comprising a controller that couples with the variable heating element and the temperature sensor.

19. The apparatus of claim 16 wherein the heated discharge platen comprises:
a plurality of channels, wherein each of the electrical heating elements is positioned in a corresponding channel.

20. The apparatus of claim 19 wherein:
each of the plurality of channels is circular; and
each of the electric heating elements is circular or annular.

\* \* \* \* \*

UNITED STATES PATENT AND TRADEMARK OFFICE
CERTIFICATE OF CORRECTION

PATENT NO. : 8,746,132 B2
APPLICATION NO. : 11/203508
DATED : June 10, 2014
INVENTOR(S) : Eric Clay Lawrence and Mark Patrick Lawrence It is certified that error appears in the above-identified patent and that said Letters Patent is hereby corrected as shown below:

In the Claims:

Column 4, line 12, (Claim 3, line 2), change "couples to" to --couples--.

Column 4, line 26, (Claim 7, line 3), change "channels channel" to --channels,--.

Signed and Sealed this
Thirtieth Day of September, 2014

Michelle K. Lee
*Deputy Director of the United States Patent and Trademark Office*